Nov. 16, 1971   G. CHUDYK   3,620,114
SHEET MATERIAL CUTTING MACHINE
Filed March 9, 1970   6 Sheets-Sheet 1

INVENTOR
GEORGE CHUDYK
BY
Amster & Rothstein
ATTORNEYS

Nov. 16, 1971  G. CHUDYK  3,620,114
SHEET MATERIAL CUTTING MACHINE
Filed March 9, 1970  6 Sheets-Sheet 4
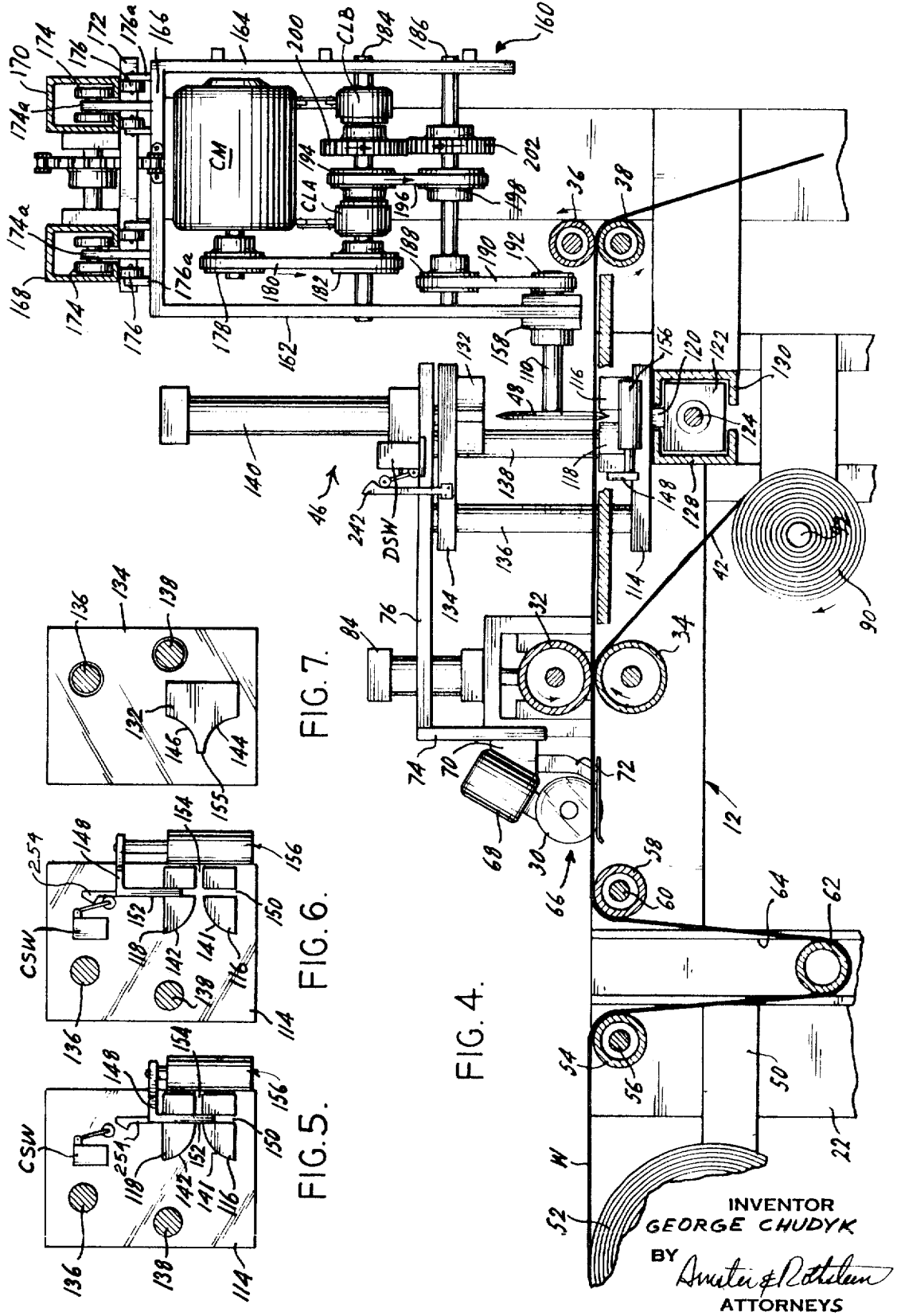
INVENTOR
GEORGE CHUDYK
BY
ATTORNEYS Nov. 16, 1971   G. CHUDYK   3,620,114
SHEET MATERIAL CUTTING MACHINE
Filed March 9, 1970   6 Sheets-Sheet 5
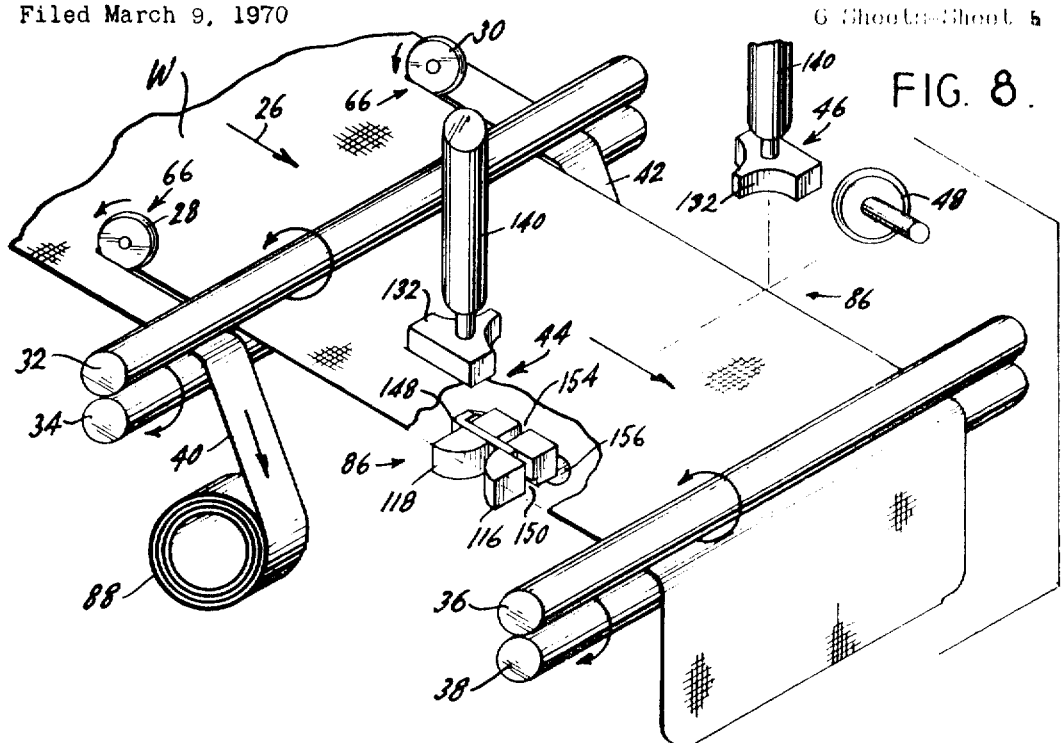
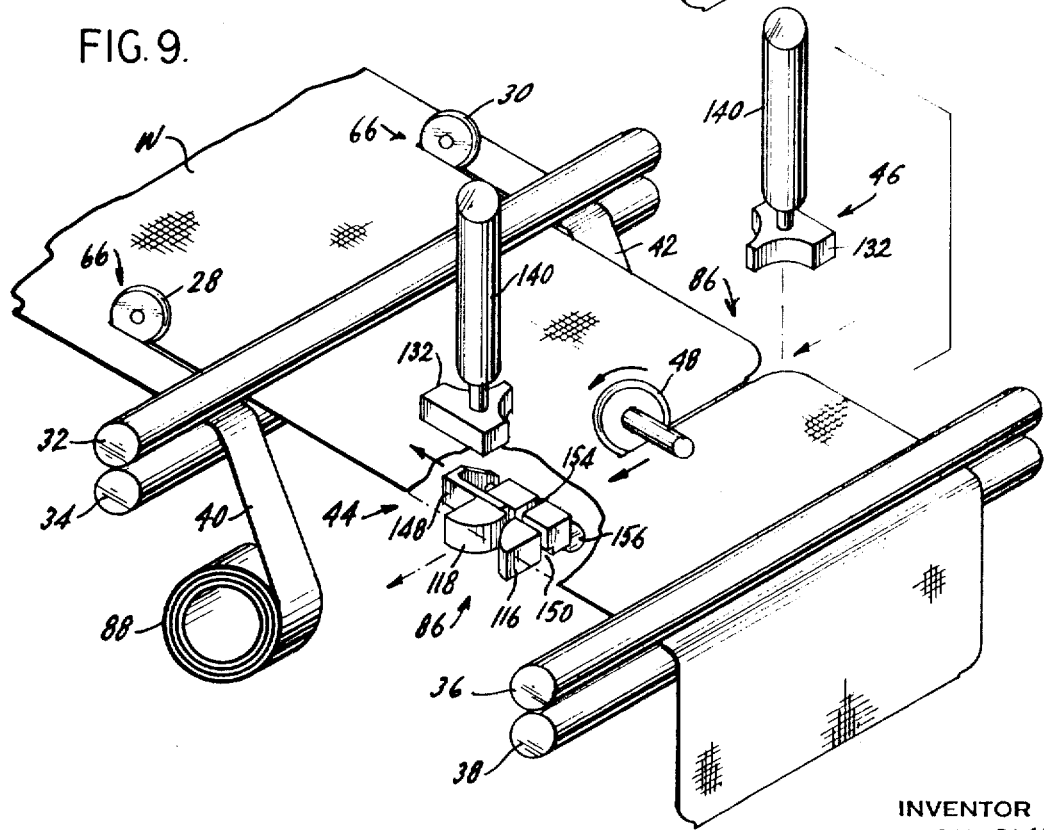
INVENTOR
GEORGE CHUDYK
BY
Anater & Cottuden
ATTORNEYS

United States Patent Office 3,620,114
Patented Nov. 16, 1971

3,620,114
SHEET MATERIAL CUTTING MACHINE
George Chudyk, Woodcliff Lake, N.J., assignor to Oscar
I. Judelshon, Inc., Jersey City, N.J.
Filed Mar. 9, 1970, Ser. No. 17,452
Int. Cl. B26d 9/00
U.S. Cl. 83—107     10 Claims

ABSTRACT OF THE DISCLOSURE

A machine for cutting a continuous web of textile material into individual rectangular sheets having rounded corners. The machine continuously cuts bands of material from each side of the web as it travels and intermittently makes transverse cuts across the web to form sheets of proper length. A die cutting device cuts rounded corners on the sheets. The machine operates automatically to provide the several functions and may be adjusted to cut rectangular sheets of various lengths and widths.

---

The present invention relates generally to production machinery useful for cutting sheet materials. The invention is particularly directed to an improved machine for cutting a continuous roll of fabric into individual rectangular sheets, which sheets are provided with rounded corners.

There are several industries in which continuous lengths of sheet material, such as textiles or plastic films, are cut into individual rectangular pieces with rounded rather than with squared corners. One specific use for such sheet materials is in the mattress and bedding industry wherein the typical mattress shape is rectangular, save for its rounded corners. The covering for the mattress is of course, similarly shaped and the edging of the mattress is traditionally the same material as the cover. Accordingly, it is desirable to take a continuous role of fabric material, cut it into rectangular sections of the proper length and width with rounded corners for use as the top and bottom of a cover. It is also useful to use the side trim material from the continuous web (the portion cut off to reduce the width of the web to the proper width for the cover) as a long parallel ribbon which can be formed into the edging of the mattress cover.

A number of techniques have been employed in the past in an attempt to perform the cutting operation in an economical and efficient manner, however, none of the existing techniques and apparatus is fully satisfactory. One preferred method of providing a result is by slitting the material into main sections and side sections, the main sections to be later cut into the individual rectangular sheets and the side sections to act as the edging for the mattress covers. The main section is then cut either automatically or by hand at various intervals to achieve the proper length and the corners are then trimmed off. Alternatively, the center portion may be spread out on a traditional spreading table and cut in the traditional pattern cutting manner. These techniques while effective to produce the desired end product, are inherently expensive and wasteful of time, material and money. Some automatic machines have been proposed and have been tried for this purpose and one of them is illustrated in U.S. Patent No. 3,312,133 issued to David N. Judelson on Apr. 4, 1967. Although machines of this type have excellent features, they have certain failings in operation which cause them to be less than completely desirable in commercial use.

Generally, it is an object of the present invention to provide an improved sheet material cutting machine which quickly, conveniently, accurately and efficiently cuts a roll of sheet material into rectangular pieces having rounded corners. It is further an object of the present invention to provide a machine which also cuts the excess material trimmed from the sides of said roll into continuous ribbons of said sheet material.

More specifically, it is an object of the present invention to provide an improved sheet material cutting machine which can cut a roll of sheet material into individual rectangular pieces having rounded corners and into elongated strips of material and which machine avoids one or more of the disadvantages associated with prior systems for accomplishing the same result.

It is further within the contemplation of the present invention to provide a sheet material cutting device which cuts a roll of sheet material and to individual rectangular sections having rounded corners in a continuous and automatic operation and which may be adjusted as to the length and width of the rectangular pieces.

In accordance with one illustrative embodiment of the present invention, there is provided a continuously acting automatic machine for cutting a continuous roll of sheet material into rectangular sheets having rounded corners. The machine includes a frame, a supply roll, a side cutting means, rewind rollers for the material which has been trimmed by the side cutting means, curved corner cutters in the form of reciprocating die cutters, transverse cutting means, guide and drive rollers and various associated control and adjustment means for the foregoing. A pair of carriages are mounted for coordinated transverse movement from the edges of the machine toward the center and on these carriages are mounted the corner cutters and the side cutting means. By adjustment of the transverse position of the carriages, adjustment is made for both the cutting of the width of the finished sheet and for accurately locating the corner cutting means. Automatic means are provided to allow access for the transverse cutting means to make a cut across the width of the sheet material without interference from the corner cutting means.

The above brief description, as well as further objects, features and advantages of the present invention, will be best appreciated by considering the following detailed description of one illustrative embodiment of the present invention when taken in conjunction with the accompanying drawings wherein:

FIG. 4 is a sectional view taken along the line 4—4 of FIG. 2, looking in the direction of the arrows;

FIG. 5 is a sectional view taken along the line 5—5 of the FIG. 2, looking in the direction of the arrows, illustrating the configuration of the bottom portion of the curved corner cutter;

FIG. 6 is a sectional view similar to that of FIG. 5 but showing the same elements in their open position whereas the FIG. 5 illustration shows them in their closed configuration;

FIG. 7 is a sectional view taken along the line 7—7 of FIG. 4, illustrating the upper portions of the corner cutter;

Figure 1:
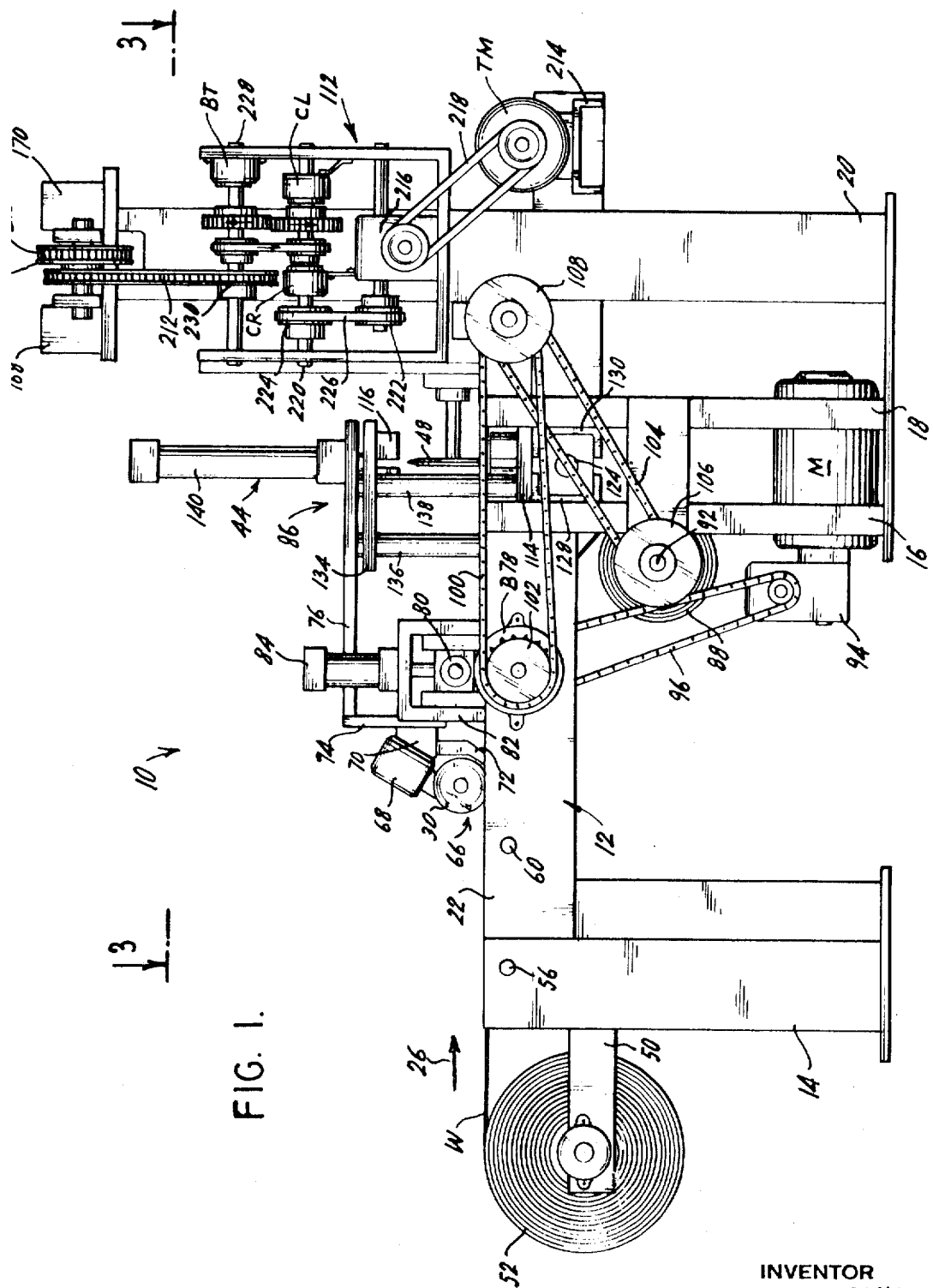
FIG. 1 is a front elevational view of the machine in accordance with the present invention showing the overall arrangement of its various stations.

FIGS. 8 and 9 are schematic views of some of the operative elements of the machine showing a web of material being cut in the machine. Specifically, FIG. 8 illustrates the advancement of a web of material through the machine and the operation of cutting the curved corners and FIG. 9 illustrates the halting of the web of material, the movement of the corner cutter means into their open clearance position and the transverse cutting of the web of material into individual rectangular sheets; and FIG. 10 is a schematic electrical diagram showing the control circuit, with appropriate mechanical and pneumatic means indicated, which controls the machine illustrated in the drawings.

Now referring specifically to the drawings, there is shown in FIG. 1, an improved sheet material cutting machine which is generally designated by the numeral 10. The various operative elements of the machine 10 are mounted on a frame which is designated by the numeral 12 and includes legs 14, 16, 18, 20 at locations from the left to the right of the machine 10 as viewed in FIG. 1 and a pair of main cross beams 22, 24 mounted on the legs. All of the various operative elements of the machine are mounted on the frame 12.

Figure 10:
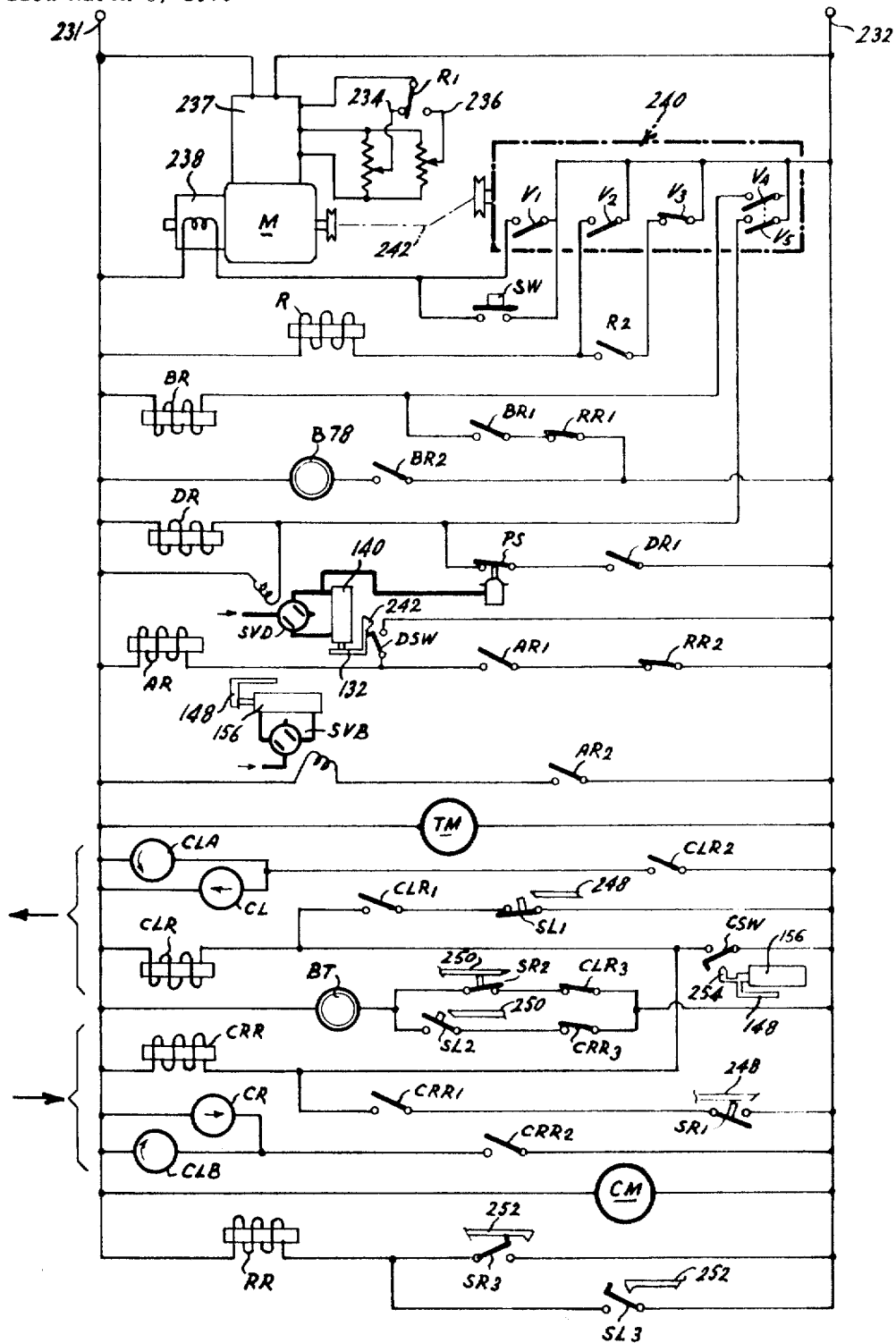

Reference is now made to FIGS. 9 and 10 for a preliminary description of some of the operative elements of the machine. A web of material W moves in the direction of the arrow 26 and, as it moves, it is cut to a predetermined width by a pair of side cutters 28, 30. The forward travel movement of the web W is accomplished by the action of the first pair of driven rollers 32, 34 and the second pair of driven rollers 36, 38. The distance between the side cutters 28, 30 is adjusted to be the width of the finished rectangular sheet. The trim which is cut off, here designated by the numerals 40, 42, is rolled up into appropriate rolls 88, 90 for later use. Periodically, the linear movement of the web of material W is halted and a pair of corner cutter die sets, generally designated by the numerals 44 and 46, which are mounted on opposite sides of the web W, are activated to cut out double arced kerfs in the opposite edges of the web. After this corner cutting operation is completed, and with the web of material W held stationary, a transverse cutting knife 48 is activated to move from one side of the web W to the other thereby to cut off a length of sheet material proper dimension. This transverse cutting operation is shown in FIG. 9. In order to allow for this movement, a portion of the lower members of the die cutters 44, 46 are removed from the path of motion of the transverse cutter 48 to provide clearance. It should be noted that the web of material W is held under uniform tension during the corner cutting and transverse cutting operation and that there is a fixed relationship between the operations of the cutter 48 and the corner cutting dies 44, 46. Thus, there is an accurate alignment between the location of the transverse cut and the double arced corner cuts on the web W.

Now referring back again to FIGS. 1 through 4, a description will be made as to the actual construction of the sheet material cutting 10. Mounted on the left hand end of the frame 12, on a roll mounting bracket 50, is a supply roll 52 which provides a continuous supply of web material W for the machine. The web of material W is fed along a feed path (generally designated by the numbered arrow 26) by the first and second pairs of driven rollers 32, 34 and 36, 38. As is best seen in FIG. 4, the web W initially passes over a first guide roller 54 mounted for free rotation on its axis 56 and then over a second guide roller 58, which is mounted for free rotation on its axis 60. Each of these guide rollers 54, 58 are mounted on the cross beam 22. Between the two guide rollers 54, 58 is a tension adjustment mechanism comprising a free weighted roller 62 which is restricted to vertical movement in the guide channel 64 and is effective to maintain the proper tension in the web W. This is done in a conventional manner such as providing a brake on the supply roll 52 which is controlled by a pair of micro switches at the bottom and top of the path of movement of the free guide weighted guide roller 62. When the roller 62 moves to the top of its path it strikes a micro switch which releases the brake on the supply roll 52 and when the roller 62 reaches the bottom of the allowable movement it hits a second micro switch which engages the supply roller brake. Thus, the tension in the web W will be determined by the weight of the weighted guide roller 62 hung in the loop of material W in the feed path.

After passing the tension control means, the web of material W enters the side cutting station which is generally designated by the numeral 66. As will be explained in more detail below, the side cutting knives 28 and 30 are mounted for coordinating adjustable movement toward and away from the central line of the material feed path. Thus, when the web of material W is trimmed down to the proper size, two trim sections of equal width, one from each side of the web W, are removed. The adjustment features of the positioning of the side cutters 28 and 30 will be described below and the mounting of those cutter wheels is given here. Each of the cutting wheels 28 is mounted on the output shaft of a motor 68 which has appropriate internal gearing to rotate the cutters 28, 30 at the proper speed and in the proper direction. The motors 68 are mounted on side cutter motor brackets 70 which also mount a side cutter feet 72 (best seen in FIG. 4) which extend below the web of material and act as supports and guides for the web of material W as it is cut by the side cutters 28, 30. The side cutter motor mounting brackets 70 are in turn mounted on cantilevered supports made up of the vertical arms 74 and the horizontal fixed plates 76, which, as will be explained below, are attached to the corner cutting mounting means and therefore, are moved from side to side with the corner cutters 44, 46 to adjust the width of the resulting finished sheet of material cut by the machine 10.

Immediately after the location of side cutting station 66 in the feed path is the first pair of driven pinch rollers 32, 34. Of these two rollers, roller 34 is driven directly and roller 32 is mounted on bearings which may be moved vertically so that roller 32 normally bears against roller 34 and pinches the web of material W between and is rotated by the movement of the web of material W. Specifically, driven roller 34 is mounted in the frame 12 between the cross beams 22 on appropriate bearings and is provided with a brake, labeled B–78, to assure accurate stopping of the rollers 32, 34. Roller 32 is mounted at either end in bearings 80 vertically movable in frames 82 (see FIG. 1). A pair of piston and cylinder assemblies 84 interconnect between the bearings 80 and the frames 82 and provide for the vertical movement of the upper roller 32 in order for a web of material W to be easily fed into the feed path of the machine 10 and to provide for some adjustment in the pinching pressure between the rollers 32, 34.

Next along the feed path of the machine 10 is the corner cutting and end cutting station which is generally designated by the numeral 86. Before specific description of that station is given, reference will be made to the second pair of driven guide rollers 36, 38 on the other side of the corner cut and end cut station 86. Each of the rollers 36, 38 are mounted on appropriate bearings on the cross rails 22 of the frame 12 and are positioned to rotate with the same linear velocity as the rollers 32, 34 thereby to insure that the web of material W, as it passes through and is positioned in the corner cutting and end cutting station 86, is always in uniform tension. Again, it is the bottom roller 38 which is actually driven and the top roller 36 is driven by the movement of the web W as it passes between two rollers 36, 38.

When the side cutters 28, 30, reduce the width of the web of material W to the size desired, there remains two side trim pieces 40, 42 which are rolled up and retained. It has been found that the trim pieces 40, 42 are excellent for the edges of mattress covers, and, of course, they are most easily used when they are retained in some easily manageable configuration such as in a roll. For this purpose, the trim pieces 40, 42 are first passed through the guide and feed rollers 32, 34 and then moved downwardly onto trim roll 88, 90 (see FIG. 2) which are supported on a driven shaft 92 so that the trim sections 40, 42 are constantly rolled up onto their appropriate trim rolls 88, 90.

Figure 2:
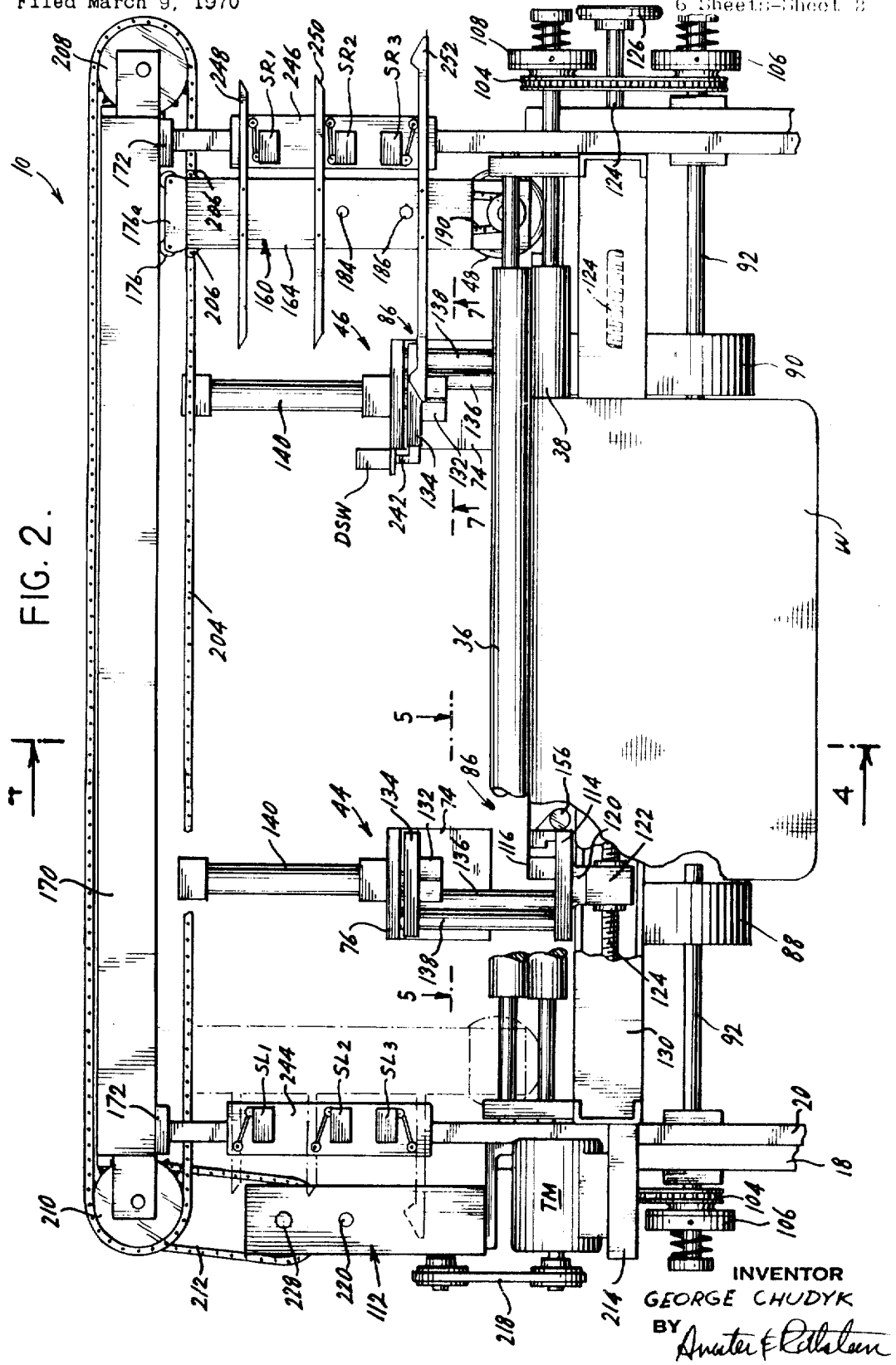
FIG. 2 is a partial end elevational view of the machine shown in FIG. 1 looking from the right end of the machine (as seen in FIG. 1) with portions broken away for the sake of clarity.
Figure 3:
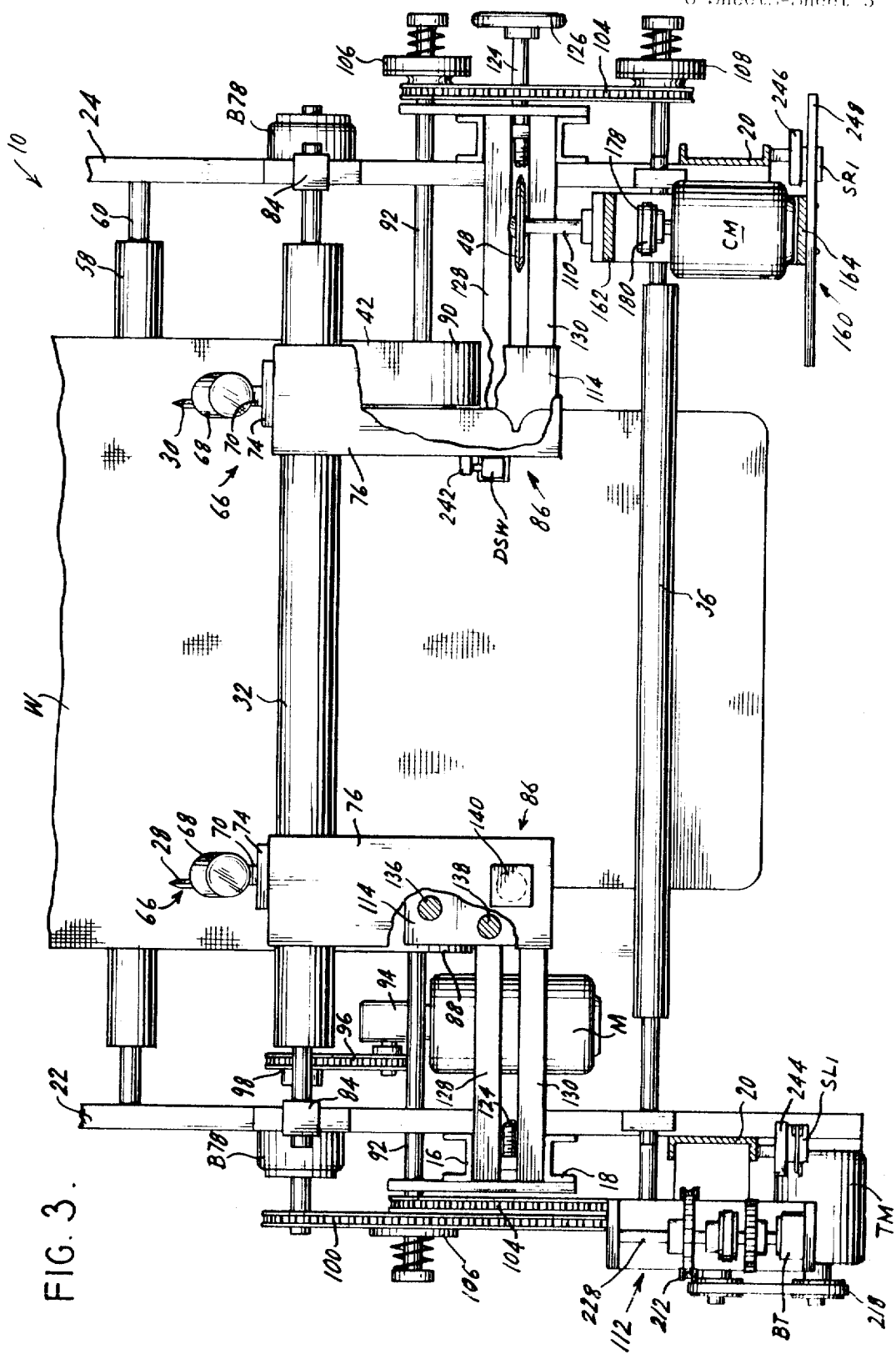
FIG. 3 is a sectional view taken along the lines 3—3 of FIG. 1, showing most of the machine in plain view and portions (above the line 33 of FIG. 1) in section.

Reference will now be made to FIGS. 1, 2 and 3 for a description of the drive mechanisms which are effective to feed the web of material W through the machine 10, to maintain the web W in its flat uniform tension configurations throughout the cycle of operations of the machine, and to keep the trim rolls 88, 90 tight. A main drive motor M is mounted on the frame 12 at its lower portion between the legs 16, 18 and is attached to a reduction gear unit 94. The power is transmitted through a link chain 96 to the driven roller 34 through a sprocket wheel 98. This direct drive causes rotation of the drive rollers 32, 34 which are provided with appropriate braking power provided by the brake B–78. From the shaft of the roller 34 the power is further transmitted from a sprocket 102 on the roller shaft through a link chain 100 to the second pair of guided feed rollers 36, 38 and specifically to a sprocket wheel (not shown) on the roller 38 which is somewhat smaller than the sprocket wheel 102 on shaft 34. Thus, roller 38 is caused to rotate at a slightly higher speed than roller 34, and therefore the web of material W between roller path 32, 34 and roller path 36, 38 is maintained in tension.

The trim rolls 88, 90 are powered through a link chain 104 between the roller 38 and the trim roll shaft 92. Specifically, the link chain 104 is attached to a sprocket wheel (not shown) on the driven roller 38 at one end and at its other end is attached to a sprocket wheel and friction clutch device 106 which is secured to the trim roller shaft 92. The drive ratio provides for excess rotation of the rolls 88, 90 and the friction clutch 106 allows the necessary slippage. Thus, appropriate rewind power for the trim sections 40, 42 are provided regardless of the radius of the trim rolls 88, 90.

This system of drives from the driven roller 38 to the trim rewind rolls is repeated on the opposite side of the machine with the same elements for driving the rewind roll 90.

In brief summary, rotary power is transmitted from the motor through the first link chain 96 to the pair of rollers 32, 34. By means of link chain 100, power is also transmitted to the second pair of feed rollers, 36, 38. Then, through the two link chains 104 on opposites of the machine 10, power is transmitted to the rewind shaft 92 and to the rewind rolls 88, 90 to wind up the trim sections 40, 42.

Description will now be made of the mechanisms at the corner cut and transverse cut station 86. Referring first again to FIGS. 8 and 9, it will be seen that two separate functions are performed at this station. First, the corner die cutters 44, 46 move vertically to trim the double arced corners from the edges of the web of material W. Secondly, along the very same line defined by the center of the corner cutters 44, 46, the transverse cutting wheel 48 cuts straight across the material to separate the individual sheets from the web W.

Now referring to FIG. 1, it will be seen that the transverse cutting knife 48 is mounted on a shaft 110 and is secured at a vertical location such that the lower portion of the wheel 48 enters into and through the feed path of the web W. The transverse cutting knife 44 and its shaft 110 are mounted on a carriage 160 which transports the knife 48 from one side of the machine 10 to the other in a continuous cutting stroke. The construction of the carriage and the appropriate drive means for both its movement and rotation of the transverse cutting knife 48 will be given in greater detail below. It is sufficient for present purposes simply to note that the transverse cutting wheel 48 is moved from one side to the other side of the machine in a first cutting stroke and then back through further cutting strokes. The knife 48 on shaft 110 is normally rotated during the cutting strokes.

The double arced corner cuts are formed by the cutting mechanisms 44, 46 which are mounted on opposite sides of the feed path of the machine 10. In each case, a lower plate 114 is mounted below the feed path and is provided with a pair of quarter circled cutting dies 116, 118. The bottom plates 114 are supported on brackets 120 (see FIG. 4) which are in turn mounted on moveable journal boxes 122. The journal boxes 122 are engaged about a threaded side adjustment screw 124 which runs the width of the machine 10 and are guided for side to side movement within a pair of cross rails 128, 130. The side adjustment screw 124 (see FIGS. 2 and 3) has an adjustment knob 126 at one end and is formed with left and right hand threads. When the adjustment screw is rotated, the journal boxes move toward or away from each other depending upon the direction of rotation of the screw 124, causing the respective bottom plates 124 to move toward or away from each other. This constitutes the side adjustment means for the corner cutting dies 44, 46. It also comprises the side adjustment means for the side cutting wheels 28, 30, because they too are mounted on the bottom plates 114 (as will be described).

Upper corner cutting dies 132, exactly complementary in shape to the lower dies 116, 118 are mounted on upper die plates 134 for reciprocal movement from their elevated position (as shown in the drawings herein) to a cutting position in which they are moved downwardly into engagement with the web W and the lower cutting dies 116, 118. A pair of vertical support and guide columns 136, 138 are rigidly secured to the lower die plates 114 and extend upwardly through guide openings formed in the upper die plates 134 and thereby guide those plates for vertical movement. The columns 136, 138 are rigidly secured to the horizontal fixed plate 76 and piston and cylinder assemblies 140 are fixed to the horizontal plates 76. They have their pistons attached to the upper die plates 134 and provide the motive force for vertical movement of those upper die plates 134 from their inactive position as shown. It will be appreciated that the web of material W is cut with its appropriate circular corner pattern by moving the web W to the proper position, stopping movement of the web and then activating the piston and air cylinder assemblies 140 to drive the upper die plates 134 downwardly in order to make the desired accurate corner cuts in the web of material W.

As it has been explained above, the side trim cutters 28, 30 at the side cutting station 66 are also mounted on the horizontal fixed plates 76. Thus, the side cutters as well as the corner cutters are mounted for sideward movement under the adjustment of the side adjustment screw 124. It will also be appreciated that there are two cutting units, one on each side of the feed path of the machine 10. Each of the units consists of a side cutter and a corner cutter and these units are mounted for movement toward and away from the center line of the feed path onto the adjustment of the side adjustment screw 124.

Reference should now be made to FIGS. 5, 6 and 7. Clearance means are provided in the lower dies 116, 118 to allow clearance room for the passage of the transverse cutter 48. Specifically, each of the lower die sections 116, 118 have two quarter circle cutting surfaces 141 and 142 and the upper die sections 132 on plates 134 have complementary curved cutting edges 144, 146. A small clearance space 154 is provided between the lower cutting dies 116, 118 and it is through this clearance space that the edge of the transverse cutting knife 48 extends when it is traveling through its cutting stroke. However, when the corner cut is to be made it is necessary to cut a line across the clearance space because, otherwise, it would be impossible to separate one piece of material. For this purpose, each of the lower cutting dies have a third element, namely a removable kerf cutter generally designated by the numeral 148. The kerf cutter is mounted in a track 150 formed in the lower cutting dies 116, 118 and slides from a position in which its straight cutting edge 152 occupies the space between the ends of the two kerf cutting edges 141, 142 to a clearance position removed from the clearance path 154. The cutting is shown in FIG. 5. When in its cutting position, the kerf cutter 148 cooperates with the straight cutting edge 155 on the respective upper cutting dies 132. In FIG. 6, the removable kerf cutter 148 is shown with its straight cutting edge 152 pulled back out of the track 150 thereby opening up the transverse clearance path 154. The transverse clearance path 154 runs exactly between the two lower cutting dies 116, 120 and is a width large enough to easily accommodate the transverse cutting knife 48. Reference to FIG. 4 will illustrate the position of the transverse cutting knife 148 extending below the surface of the web of material W and into the transverse clearance path 154. The movement of the removable kerf cutter 148 is controlled by a piston and cylinder assembly 156. A micro-switch BSW is mounted on the lower plate 114 and is engaged by an appropriate switch actuator on the removable kerf cutter 148 as it moves to its clearance position. Micro-switch BSW gives the required signal indicating the position of the kerf cutter 148 for the control circuitry which will be described in detail below.

After the removable kerf cutter 148 has been pulled out of the way by the piston and air cylinder assembly 156, the transverse cutting knife 48 is moved perpendicular to the feed direction of the web of material W in order to cut that web into pieces of desired length.

Reference will now be made to FIGS. 1, 2 and 4 for a description of the drive means for the transverse cutter 48. As may be best seen in FIG. 4, the rotary cutting knife 48 and its shaft 110 are mounted in a bearing 158 on a transversely moving carriage which is generally designated by the numeral 160. The transversely moving carriage 160 comprises an inner arm 162, a parallel outer arm 164 and a top cross member 166 which are secured together to form an upside down U shaped frame for the carriage 160. The carriage 160 is hung from a pair of transverse rails 168, 170 which are secured to the upper ends of the leg 20 at the right hand end of the machine 10 as seen in FIG. 1. Specifically, the two cross rails 168, 170 are parallel to each other and somewhat separated from each other and are mounted on cross brackets 172. Upper rollers 174 and lower rollers 176 mounted on appropriate brackets 174a and 176a, respectively, ride within and below the cross rails 168, 170 and are effective to hang the transversely moving carriage 160 and guide it for movement from one side of the machine 10 to the other. The cutter motor CM is secured to the carriage 160 on the underside of the carriage cross number 166 and, through a pulley 178 the V belt 180 and a second pulley 182, is effective to continuously drive the transverse cutting knife. Power shaft 184 delivers power to the transverse knife 48 and its shaft 110 through an intermediate shaft 186 by means of the pulley 188 on the intermediate shaft 186, the V belt 190 and the pulley 192 on the shaft cutter wheel shaft 110. Power is transmitted from the power shaft 184 to the intermediate shaft 186 alternatively in opposite directions through a first clutch CLA or a second clutch CLB. When the first clutch CLA is engaged, the pulley 194 is connected to the power shaft 184 and drives V belt 196 to turn pulley 198 which is rigidly attached to the intermediate shaft 186 and is therefore effective to turn the intermediate shaft 186 in the same direction as power shaft 184 is rotating. Alternatively, if the second clutch CLB is energized and the first clutch CLA is de-energized, the otherwise free-wheeling gear 200 is powered through the clutch CLB and is effective to drive its mating gear 202 which is rigidly attached to the intermediate shaft 186. If this power train is in effect, the intermediate shaft 186 rotates in the opposite direction from the drive shaft 184. Thus, by energizing either clutch CLA or clutch CLB, the transverse rotary cutting knife 48 will be rotated either clockwise or counterclockwise as may be desired. Since it is normally desirable to have a rotary cutting knife cut down into the sheet material, one would want the knife 48 to rotate in a counter clockwise direction as seen in FIG. 9 when the transverse movement is from the far side of the machine 10 to the near side as shown in that drawing. On the other hand when the cutting stroke of the transverse cutting wheel 48 is in the opposite direction, and opposite rotation is desired and, the drive mechanisms and clutching arrangements described above on the transverse carriage 160 are effective to accomplish this result. Alternatively, a variable direction electric motor can be used.

Movement of the transverse carriage 160 on the cross rails 168, 170 is accomplished by means of the chain 204 which is attached to the carriage 160 at 206 and which runs the length of the cross rails 168, 170 over the sprocket wheels 208, 210. The transverse chain 204 is driven by a transverse drive system, generally designated by the numeral 112, which operates through link chain 212 from the drive system 112 to the sprocket wheel 210 and, thus, to the length chain 204. A transverse drive motor TM is mounted on the bracket 214 attached to frame 12 and drives a gear reduction unit 216 through V belt 218 and appropriate pulleys. From the gear reduction 216, power is delivered to the power shaft 220 through a pair of pulleys 222, 224 and V belt 226. Power is transmitted from the power shaft 220 to an intermediate shaft 228 through a pair of alternatively engaged clutches CL and CR for left hand and right hand travel respectively. The two shafts 220 and 228 are interconnected by gears and a V belt in the same manner as are the shafts 186 and 184 on the transverse carriage 160. The intermediate shaft 228 is engaged by the link chain 212 at sprocket wheel 230 to drive the traverse link chain 204, and therefore to move the cradle 160 through its cutting strokes. A traverse brake BT is positioned on the intermediate shaft 228 and functions to hold that shaft and therefore the entire traverse carriage 160 stationary except when a tranverse cutting stroke is to be effected. Alternatively, a variable direction electric motor can be used to drive the chain 204.

An understanding of the machine can be better appreciated by considering the following description of the operation of the machine. Under the drive of motor M, drive rollers 32, 34 and 36, 38 advance the web of material W along the feed path. By means of a rotation counter, the linear movement of the web W is determined and, after an amount of travel equal to the length of desired cut sheet, movement of the rollers is halted by brake B78. During this movement, the side cutting rollers 28, 30 trim the width of the web W to the required amount and the trim material 40, 42 is wound on the trim rolls 88, 90. As soon as the web movement is halted, the corner die cutters 44, 46 are activated by energizing their respective piston and cylinder assemblies and the double-arced corner cuts are made in the web W. The corner cutting units 42, 44 are moved into their clearance positions by the raising of the upper plates 134 and the movement of the removable kerf cutter 148 from the transverse clearance path 154. The rotating transverse cutting knife 48 is then moved in its transverse cutting stroke by means of the transverse motor TM powering the carriage 160 to move along the tracks 168, 170 across the width of the web W. With this accomplished, the drive rollers 32, 34 and 36, 38 are reenergized and the cycle is started again. The cut piece of web is discharged from the machine on to any conventional type of further equipment. For example, the resulting product may simply be deposited into a bin, it may be deposited onto a folding beam which catches and folds the sheet material as it is discharged, or it may be carried away on any conventional conveyer system. When the web W is again advanced, the amount necessary to pass an amount of web across the cutting line sufficient to form a further sheet of desired length, the feed is again stopped and the corner cutting and transverse cutting cycle is again activated. During this next cycle, the die cutters 44, 46 function exactly the same as they did in the previous cycle. However, the transverse cutting wheel 48 is rotated in the direction opposite to that which it displayed in its previous cutting and the transverse carriage 160 is moved in a direction opposite from its previous strokes. Of course, in each case, the lower die portions 118 of the die cutters 44, 46, are provided with clearance room by movement of the removable curve cutter 148 out of the clearance slot 54 by operation of the piston cylinder assembly 156.

Further repetitions of the cycle produce further cut sections of web material having rounded corners.

Reference will now be made to FIG. 10 for a description of the various control and switching elements utilized in the machine 10. Power lines 231, 232 are provided to supply appropriate electric current for the various elements of the machine. The motor M is connected to the power lines 231, 232 through an appropriate motor control 237. Fast and slow speed control circuits 234, 236, respectively, are provided on a magnetically controlled motor switch R1 to place the motor M in its desired speed range. The motor M also has a magnetic clutch 238 which is activated only when rotational power is to be delivered. A timer-counter and control unit of commercial construction, here designated by the numeral 240 (available commercially in one form under the name Veeder Root Company Electrical Counter) is provided in the motor clutch circuit. The electrical counter 240 is engaged with the motor M schematically shown here by a belt 242 and appropriate pulleys. The counter's mechanical connection to the rotating parts of the machine enables it to count and measure the linear movement of the web of material in the feed path.

The start of operations is commenced by pressing the push button switch SW which effectively closes the motor clutch circuit 238 and caused commencement of counting operations which closes the internal switch V1 in the counter control 240. This effectively drives the motor M at fast speed, with the motor control switch R1 on its fast circuit 234. When a sufficient amount of movement of the feed rollers 32, 34, 36, 38 has caused the desired length of web W to cross the cutting line, the electrical counter and control 240 closes its second switch V2 which is effective to energize solenoid R. The energization of solenoid R causes the speed control switch R1 to flip to its second or slow circuit 236, thus slowing down the motor M and also closes its own holding circuit through the switch R2. Now, at lower speeds of the web, W, the timer opens switch V1 as soon as the exact proper length of web has passed by the cutting station thus stopping the motor M. It also opens the normally closed switch V3 which de-energizes solenoid R which causes the speed control contacts R1 and R2 to return to their normal positions as shown in FIG. 10.

When the electrical counter on control 240 measures that a proper amount of web W has passed the cutting station, it closes switches V4 and V5 which are effective to respectively activate the solenoids of the brake relay BR and the die cutter relay DR. The activation of the solenoid of the brake relay BR closes its switches BR1 and BR2, BR1 serves as a holding circuit and BR2 serves to activate the brake B78 on the main drive roller 34 thus insuring that there is no movement of the web W during the cutting operations. Of course the motor clutch 238 is deactivated at this time and the various switches on the control unit 240 have been returned to their positions as shown in FIG. 10 since the brake relay BR is held energized through its holding switch BR1 and the die relay DR is energized through its holding circuit through its holding switch DR1.

The die relay DR, when energized, engages its holding switch DR1 as explained above and energizes the solenoid valve control SVD to cause fluid to enter into the piston and air cylinder assembly 140 thereby to drive the upper die 132 downwardly to perform the corner cutting operations. The pressure in the pneumatic line feeding the die cutting piston and cylinder assemblies 140 also feeds a pressure sensitive switch PS, which, when sufficient pressure builds up to indicate that the die cutting operation is completed, automatically opens, thereby de-energizing the die relay DR which, in turn, opens the holding switch DR1 and returns the solenoid control valves SVD to its normal position. This moves the upper die 132 back up to its upper inactive position. When this occurs, a probe 242 traveling with the upper die 132 engages a one-way switch DSW just prior to its return to its completely inactive position which momentarily energizes the actuating relay AR. The momentary actuation of the actuating relay AR causes the closing of its holding circuit through switch AR1 and a closing of its second switch AR2. The second switch AR2 of relay AR is in the circuit with the solenoid control for valve SVB. Valve SVB is the valve which controls the movement of the removable kerf cutter 148 by means of the piston and cylinder assembly 156. It is this movement which provides the clearance opening 154 between the lower die members 116, 118 for passage of the transverse cutter 48.

With continued reference to FIG. 10, a description will now be given of the energization and control means for the transverse cutting operation performed by the machine 10. Initial reference, however, should be made to FIG. 2 to see the location of the several control switches SL1, SL2, SL3, SR1, SR2, and SR3 and the mechanical means by which they are activated. These switches are mounted on pairs of switch mounting boards 244 and 246 mounted on the left and right hand corners of the machine 10 as viewed in FIG. 2. It will be seen that the carriage 160 moves from the right hand position as shown in full line in FIG. 2 to the left hand position as shown in dotted line configuration in that drawing. Three switch contact arms 248, 250, 252 are secured to the carriage 160 at positions fixed such that the arms engage the microswitches on the switch mounting boards 244, 246. When the carriage moves from one end of its path of movement to the other. The switch contacting arms 248, 250, 252 each extends beyond the confines of the carriage 160 and are in position to engage the contact arms of the respective micro-switches. Specifically, contact arm 248 engages switches SL1 and SR1, contact arm 250 engages switches SL2 and SR2 and contact arm 252 engages switches SL3 and SR3.

Reference should again be made to FIG. 10 for a description of the circuitry in which the various switches are imployed to control the transverse cutting operations of the machine 10. Both the transverse drive motor TM and the transverse cutting motor CM are connected with normal electrical connections between power lines 231 and 232 as shown in the drawings. When the removable kerf cutter 148 is pulled out of the clearance opening 154, a probe 254 (see FIGS. 5 and 6) contacts normally open clearance switch CSW and closes the circuit to indicate that the clearance room for the transverse cutting knife 48 is open. The closing of that circuit energizes the left cutting relay CLR which functions to close its holding circuit through relay control switch CLR1 and through the switch SL1 which is opened upon completion of the left hand traverse of the carriage 160. The energization of the left cutting relay CLR also closes relay control switch CLR2 which energizes the left traversing clutch CL and the counter clockwise rotation clutch CLA for the cutting knife 48. Under the impetus of the left traverse clutch CL, the carriage 160 traverses to the left until such time as the contact arm 248 contacts control switch SL1 which opens up the holding circuits for the control relay CLR. This then causes CLR2 switch to open, de-energizing the left traverse clutch CL and halting leftward movement of the carriage 160. At the same time that the left control relay CLR initially energizes the left traverse clutch CL, at the beginning of a transverse cut, it deenergizes the traverse brake BT by opening the normally closed switch CLR3. However, at the end of the leftward traverse movement, switch contact arm 250 is effected to close switch SL2 which again energizes the brake BT and causes a positive halt of the traverse carriage 160. Switch SL2 completes a circuit through normally closed relay control switch CRR3 which will be described in greater detail below. When the carriage 160 pulls away from the right hand end of the machine (in FIG. 2) in movement toward its left hand position, arm 250 allows switch SR2 to assume its normally open position. At the same time, arm 248 allows switch SR2 to assume its normally closed position and arm 252 gives a pulse closing for switch SR3 (to be explained more completely below). These settings of switches SR1 and SR2 will be needed for the return movement of the carriage 160 in its next cutting stroke.

With the completion of the cutting stroke the left, clutch CL is disengaged by the action of the contact arm 248 engaging and opening switch SL2 and the brake BT is engaged in response to the closing of switch SL2 by arm contact 250.

Just prior to the end of movement of the carriage 160 toward the left, the lowest switch contacting arm 252 makes momentary contact with the actuating arm of switch SL3 causing momentary closing of that switch and, therefore, momentary energization of the reset relay RR. The energization of the relay RR functions to reset the control elements of the machine to place them in condition for the cycle. Specifically, energization of reset relay RR momentarily opens the relay control switch RR1 which breaks the holding circuit for the brake relay DR and thereby releases the brake B78, allowing rotation of the feed rollers. The energization of reset relay RR also momentarily opens solenoid control switch RR2 in the actuating circuit which opens the holding circuit for the actuating relay AR. The solenoid control valve SVD is thereby moved back to its position as shown in FIG. 10 and the removable kerf cutter 148 is brought back into its active, cutting position.

At this point the cycle of the machine has been completed and the timer and counter unit 240 has moved completely back to its starting position. Once again, switch V1 closes engaging the motor clutch 238, switch V2 closes to place the motor at its fast speed, the web of material W is fed along the feed path of the machine, the corner cutting dies 46, 48 are activated and the solenoid control valve SVB once again moves to control the removable kerf cutter 148 out of the clearance path 154 to allow for a second transverse cutting stroke by the transverse cutting knife 48. In this second cycle, however, the cutting wheel 48 and its associated carriage 160 will move from the left to the right rather than from the right to the left. Therefore, the opposite drive mode is needed for the carriage 160 and the opposite rotation is desired for the rotary knife 48. Again, the operations are initiated by the closing of switch CSW by the movement of the removable kerf cutter 148 to energize the right cutting relay CRR. This relay provides its own holding circuit through its switch CRR1 and through the switch SR1 which is open because the carriage 160 is at the left hand end of its travel. Of course, left cutting relay CLR does not become energized because its holding circuit is open because switch SL1 is open by engagement with the left end of switch arm 248. The energization end of the right cutting relay CRR additionally causes switch CRR2 to close which engages the right cutting clutch CR and energizes the clockwise rotation clutch CLB for the rotary cutting knife 48. The traverse brake BT is opened by the opening of normally closed switch CRR3 which opens the circuit through that switch. Of course, no current goes through the other branch of the traverse brake actuating line because switch SR2 is open since the carriage 160 is removed from the right hand end of the machine. As the carriage 160 moves toward the right, contact arm 248 allows switch SL1 to close in preparation for the next cycle, contact arm 250 allows switch SL2 to open in preparation for the next cycle, and contact arm 252 disengages switch SL3. At the completion of the right hand cutting stroke by the transverse cutting knife 48, the right hand end of contact arm 248 engages switch SR1 and opens it, thereby de-energizing the right cutting relay CRR which opens switch CRR2 and thereby disengages the right traverse clutch CR and the clockwise rotation clutch CLB. At the same time, contact arm 250 engages switch SR2 and closes it in preparation for the next cutting cycle. Simultaneously arm 252 gives a momentary pulse to switch SR3 which pulses the reset relay RR which opens switch RR1 releasing the main drive brake and opens switch RR2 in order to move the removable kerf cutter 148 back into its active cutting position. Once again, the control unit 240 takes over to start the feed and cutting cycle one again.

Thus it will be seen that intermittently, the drive means move lengths of web material along the feed path. Each time the desired length moves down the path, the drive creases and the corner die cutting operation commences. Immediately the removable kerf cutting elements are drawn out of the lower members of the die cutters to provide clearance room for the transverse rotary knife cutter which then is moved across the width of the machine to make the end cut on the sheet material as the desired location and exactly in line with the location of the previously formed corner cuts. In one cycle the transverse rotary cutter moves in one direction across the feed path and in the next cycle the knife moves in the other direction across the feed path. When the transverse cut has been accomplished, the machine is automatically recycled for continuous feeding, halting, corner cutting and end cutting in a repetitive operation.

It will be appreciated from the foregoing description that a machine in accordance with the present invention provides a continuous operation for the production of rectangular sheets of material having rounded corners. Whereas in prior machines great difficulty was encountered in insuring that the end cuts were in exact alignment with the corner cuts, the present machine accomplishes this result surely, efficiently and with great dependability. Absolutely no human guidance is needed for this machine in accordance with the present invention once it has been set up and operating properly and it is, as described above, easily adjustable both for width and length of sheets to be cut from it. The width is adjusted simply by rotating a single crank in order to move the side cutting elements and the corner cuting elements to their desired spaced apart locations. The length of the machine is easily varied by simply setting the counter to count the proper number of revolutions for the amount of material which is desired to pass by the cutting station of each successive cycle of the machine.

It will be appreciated if the present invention may be incorporated in machines which vary in greater and lesser extents from the specific presently preferred design described here. The scope and breadth of the invention is described in the following claims.

What I claim is:

1. An apparatus for cutting length of thin flexible material into sheets of desired widths and lengths and with rounded corners comprising a frame, feed means mounted within said frame defining a flow path for flexible material to be cut by said apparatus, a pair of side cutters mounted on said frame at a side cut station for continuously severing from said material the side edges thereof, said cutters being mounted for adjustable movement towards and away from each other, transverse to the flow of material in said flow path, for adjusting the width of sheets cut on said apparatus, take-up means adjacent said side cutting station including a pair of curved corner cutters in alignment, one with the other, on opposite sides of said material and mounted for adjustable movement, toward and away from each other, transverse to the direction of flow of said material, each of said corner cutters having cutting means including a first reciprocating die and a second die for cutting a first rounded corner on one side of a sheet end line and a second rounded corner, of the same radius, on the opposite side of the end line, means in one of said dies for moving at least a portion thereof away from the location of said sheet end line for creating a clearance path for means to cut said material along said sheet end line, an end cutter mounted for reciprocal movement from one side of said flow path to the other side thereof along said sheet end line and within said clearance path, and control means for said apparatus wherein said feed means moves material along said flow path with said side cutters removing the side edges thereof for stopping said flow of material after an amount of material equal to the length of the desired sheet has passed said end cut line, for reciprocating said curved corner cutters to form corner cuts in the opposite side edges of said material, for moving at least said portion of said one of said dies to form a clearance path in alignment with the location of said end cut, for driving said end cutter in a first transverse cutting movement for returning said portion of said one of said dies into its cutting position, and for continuously repeating said cycle of advancement corner cutting and end cutting to continuously cutting sheet material into lengths of desired width and length with rounded corners.

2. An apparatus in accordance with claim 1 including width adjustment means mounted on said frame with said side cutters and corner cutters are mounted together thereon for simultaneous movement.

3. An apparatus in accordance with claim 2 wherein said width adjustment means includes two movable carriage members mounted for movement transverse to said feed path and on opposite sides thereof and adjustment means interconnecting said carriage members for simultaneously moving them toward and away from the center of said feed path, one of said corner cutters and one of said end cutters mounted on each of said carriage members such that adjustment means simultaneously adjusts the transverse cutting position of each of said corner cutters and said side cutters.

4. An apparatus in accordance with claim 1 wherein said first dies are above said feed path and said second dies are below said feed path.

5. An apparatus in accordance with claim 1 wherein said dies have two curved cutting edges spaced from each other and a bridging cutting edge therebetween.

6. An apparatus in accordance with claim 5 wherein said bridging cutting edge constitutes said movable portion of said one die, said portion movable out of its cutting position to provide said clearance path for said end cutter.

7. An apparatus in accordance with claim 6 wherein said end cutter comprises a circular rotating knife mounted for transverse movement through a cutting stroke from one side of said feed path to the other side thereof along a line defined by the bridging portions of said corner cutting dies, said circular knife traversing said clearance path during its cutting stroke.

8. In a machine for cutting flexible sheet material into individual sheets of desired width and length with rounded corners of the type having feed means to advance material along a feed path, side cut means to trim said material to the desired width, corner cutters to cut said desired curved corners into said material and end cut means to cut said material into desired lengths, the improvement comprising said corner cutters including a pair of corner cutting dies on opposite sides of said feed path each having a first movable member and a second fixed member with a section of said second fixed member being movable between a cutting position and a clearance position for providing a clearance path and said end cut means operatively mounted for cutting said material at the same location it is cut by said corner cutters, said end cut means cutting said material from side to side and in cooperative relationship with said corner cutters and moving through said clearance path while cutting said material.

9. A device in accordance with claim 8 wherein said first and second die members each have two curved sections and a bridging section therebetween to form a two-part die to cut two corners at one time, one on each side of an end line of said material with one of said corners on two different sheets of material.

10. A device in accordance with claim 8 wherein said movable section of one of said die members includes said bridging portion and said clearance path is provided between said two curved portions such that said end cut is made between the two corners but by said die members.

References Cited
UNITED STATES PATENTS

| | | | |
|---|---|---|---|
| 3,177,749 | 4/1965 | Best et al. | 83—214 X |
| 3,203,291 | 8/1965 | Elsas | 83—406 X |
| 3,416,396 | 12/1968 | Donner | 83—214 X |
| 3,461,766 | 8/1969 | Anderson | 83—406 X |

FRANK T. YOST, Primary Examiner

U.S. Cl. X.R.

83—208, 214, 216, 406, 408, 519, 693